United States Patent Office 3,343,000
Patented Sept. 19, 1967

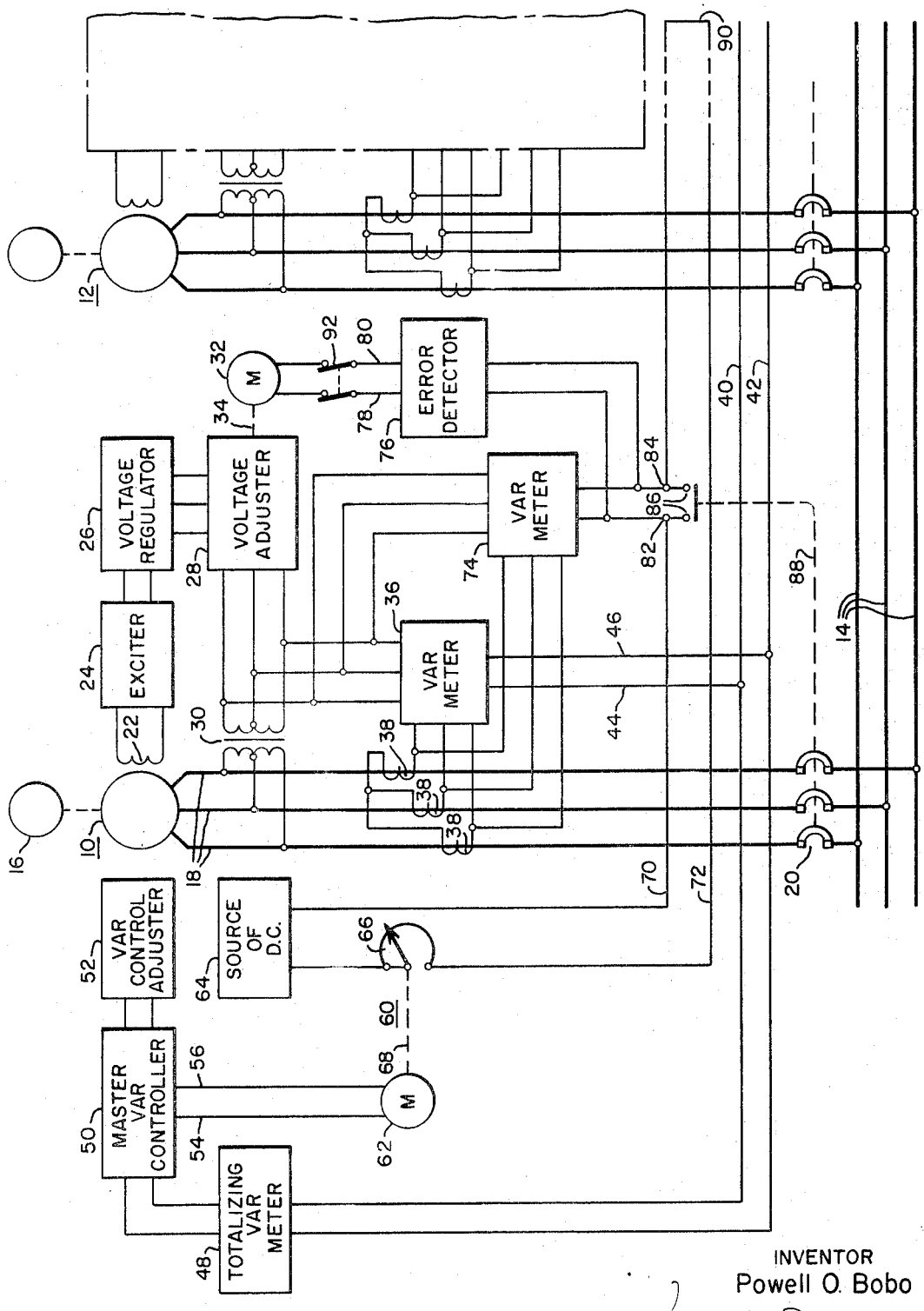

3,343,000
CONTROL SYSTEMS FOR CONTROLLING THE REACTIVE POWER OF A PLURALITY OF A.C. GENERATORS
Powell O. Bobo, Wilkinsburg, Pittsburgh, Pa., assignor to Westinghouse Electric Corporation, Pittsburgh, Pa., a corporation of Pennsylvania
Filed Dec. 3, 1964, Ser. No. 415,731
4 Claims. (Cl. 307—57)

This invention relates in general to control systems, and more particularly to control systems for controlling the reactive power of a plurality of alternating current generators.

The size and complexity of modern electrical power systems has created a need for controlling the reactive power or wattless component of the current according to the overall power station requirements. It would be desirable for the reactive power of each alternating current generator in the electrical system to be controlled according to the deviation of the reactive power of the complete generating system from the desired magnitude.

Accordingly, it is an object of this invention to provide a new and improved control system for controlling the reactive power of a plurality of alternating current generators.

Another object of the invention is to provide a new and improved control system for controlling the reactive power of an alternating current system by controlling the reactive power of each of a plurality of alternating current generators according to a master reference signal.

A further object of the invention is to provide a new and improved control system which provides reactive power control of a plurality of alternating current generators from one control point.

Briefly, the present invention accomplishes the above cited objects by providing a control system in which the reactive power or vars of each of a plurality of alternating current generators are totalized to produce a first signal which is compared with a second signal responsive to the desired system reactive power. This comparison produces a master reference signal or third signal which is compared with a fourth signal produced at each alternating current generator which is responsive to the reactive power of its associated alternating current generator. Any deviation between the master reference signal and the fourth signal produces a fifth signal which changes the output voltage level of the alternating current generator until the fourth signal equals the magnitude of the master reference signal. Thus, the station reactive power is maintained at the magnitude set by the master station var selector, with the reactive power of each alternating current generator being controlled by the same master reference signal.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawing, in which the single figure is a schematic block diagram illustrating the teachings of the invention.

Referring now to the drawing, the figure illustrates an electrical generating station in which alternating current generators 10 and 12 are connected to a common bus 14. Although only two alternating current generators are shown in the figure, it will be understood that the invention is applicable to any number of alternating current generators. Also, since the control associated with each alternating current generator is the same, only the control associated with alternating current generator 10 is shown in the figure.

The alternating current generator 10 is driven by a suitable prime mover 16, such as a steam or gas turbine, or waterwheel, and it delivers electrical energy to the main three-phase bus 14 through a three-phase feeder bus 18 and circuit breaker 20. The output potential of alternating current generator 10 is determined by the excitation potential applied to its field winding 22 by exciter 24. Exciter 24 may be of any suitable type, such as a self-excited direct current generator which has its field winding or windings connected to receive an excitation control signal from a voltage regulator 26. Voltage regulator 26 is connected to a voltage adjuster 28, such as a variable transformer, which receives a measure of the output voltage of alternating current generator 10 from a three-phase potential transformer 30 and applies this measure of the generator output potential to voltage regulator 26. By changing the setting of the voltage adjuster 28, the measure of the generator output voltage may be changed to cause the regulator 26 to regulate to any desired predetermined voltage. The voltage adjuster 28 is motor operated through motor 32 and mechanical linkage 34, for purposes that will be hereinafter described.

Voltage regulator 26 may be of any suitable type, such as the voltage regulator described in United States Patent 3,086,162, issued Apr. 16, 1963, and assigned to the same assignee as the present application.

The system described to this point will operate on voltage control. The voltage adjuster 28 is set to the voltage to be regulated, and voltage regulator 26 will provide an excitation signal which is applied to exciter 24 that will enable alternating current generator 10 to provide the predetermined potential to feeder bus 18.

With modern, complex electrical power generating systems, voltage control alone, however, may not be satisfactory. It may be desirable to adjust the magnitude of the voltage to be regulated, up or down, to maintain a predetermined system reactive power. This invention discloses a system in which the reactive power of any number of alternating current generators may be individually controlled from a master control point to provide the desired system reactive power.

The total reactive power of the alternating current system may be obtained by utilizing a var meter 36 at each generating station or alternating current generator, which produces an output potential proportional to the reactive power of the associated generator. Var meter 36 may be of the type which utilizes a Hall generator, producing a direct current output potential proportional to the reactive power of the generator, or any other type of var meter which poduces an electrical quantity responsive to reactive power. The var meter 36 may receive a measure of the output potential from its associated generator through potential transformer 30, which is phase connected by appropriate components in the var meter 36, such as by transformers, reactors, or other suitable means, to be substantially in phase with the wattless component of the generator output current. A measure of the generator output current may be obtained from current transformers 38 and applied to var meter 36. Var meter 36 will then provide a direct current responsive to the reactive power of alternating current generator 10 and apply the direct current to conductors 40 and 42 through output conductors 44 and 46, respectively. The var meters associated with all of the other alternating current generators will also have their outputs connected to conductors 40 and 42. The total of the currents responsive to reactive power from each alternating current generator in the alternating current system may be obtained by parallel addition to produce an indication of the total system reactive power, or the outputs of the individual var meters may be fed to totalizing means, such as a totalizing var meter 48. Totalizing var meter 48 will receive all of the signals from the generating stations and provide a signal responsive to the reactive power of the alternating current system. A totalizing system similar to the one disclosed in U.S. Patent 3,072,888, issued Jan. 8, 1963, and assigned to the same assignee as the present application, may be used if desired.

The signal proportional to system reactive power from totalizing var meter 48 is applied to master var controller 50. The function of master var controller 50 is to compare the signal proportional to actual system reactive power with a signal corresponding to the desired system reactive power. A signal corresponding to the desired system reactive power is provided by var control adjuster 52. Var control adjuster 52 may be any suitable reference potential, such as a battery, or other source of direct current potential, along with an adjustable impedance means for allowing the magnitude of the potential to be preselected. Master var controller 50 compares the signal from totalizing var meter 48, responsive to actual system reactive power, with the signal from var control adjuster 52, the magnitude of which corresponds to the desired system reactive power. Master var controller 50 may be of the magnetic amplifier type, solid state type, or any other suitable type, which will compare two signals and produce a polarized output signal when the two signals to be compared are unequal. If the signals from totalizing var meter 48 and var control adjuster 52 are equal, master var controller 50 will not produce an output signal. If the signals are not equal, an output will be provided at conductors 54 and 56 whose magnitude and polarity depends upon which of the signals to be compared is larger and the magnitude of the difference.

The output of master var controller 50, appearing at conductors 54 and 56, is applied to joint var controller 60, which includes motor 62, direct current source 64, and motor driven rheostat 66. Motor 62 is connected to conductors 54 and 56, and rotates in either direction, depending upon the polarity of the signal from the master var controller 50. The motor 62 is connected through a suitable mechanical linkage 68 to rheostat 66, and thus controls the magnitude of the direct current allowed to flow in the circuit which includes conductors 70 and 72. The output of joint var controller 60 is a proportional equivalent to one per unit vars of each alternating current generator, and is used, in effect, as a master reference signal for each alternating current generator on joint var control.

Although joint var controller 60 is illustrated as including a motor 62 and rheostat 66, it will be obvious that other means for increasing or decreasing the magnitude of direct current from direct current source 64, in response to a signal from master var controller 50, may be utilized. In other words, any means which will change the magnitude of the direct current from direct current source 64 to a value which will produce zero output from master var controller 50, may be used.

The impedance of the circuit which includes conductors 70 and 72 is low compared with the impedance of the source of direct current 64 and rheostat 66, to insure that the current flowing in conductors 70 and 72 will be substantially constant for each setting of rheostat 66 and for any or all other changes in impedance within the circuitry of leads 70 and 72. This constant current signal from joint var controller 60, as hereinbefore explained, is used as a master reference signal and is applied to each alternating current generator under joint var control. This master reference signal from joint var controller 60 is compared with a signal proportional to the vars or reactive power of each alternating current generator under var control. This may be accomplished, as shown in the figure, by connecting the output of a var meter 74 at each alternating current generator in series circuit relation with the circuit including the source of direct current 64, rheostat 66, and conductors 70 and 72. Var meter 74 may be constructed similar to var meter 36, hereinbefore described, and is of the type which produces a direct current output potential proportional to the reactive power of its associated generator. The difference, if any, between the signal produced by the substantially constant current flowing from direct current source 64, and the signal produced by var meter 74, is detected by differential or error detector 76. Error detector 76 may include an impedance means, with the signal from var meter 74 being impressed across one half its length, and the signal produced by current flow from joint var controller 60 being impressed across the other half of its length, with the polarities of the signals being opposed. Thus, equal signals from joint var controller 60 and var meter 74 will produce zero differential or zero error signal across the impedance. If the signals are not equal, an error signal will be produced by error detector 76, which appears across the impedance at conductors 78 and 80, with the polarity of the error signal being determined by which of the two signals is larger. This differential circuit arrangement may be produced as shown in the figure, by opening the circuit provided by conductor 70 at terminals 82 and 84, and connecting the output of var meter 74 to these terminals. Error detector 76 is also connected to terminals 82 and 84 to detect any difference in the signal from joint var controller 60 and the signal from var meter 74.

Although two var meters, 36 and 74, are shown in the figure, it will be understood that only one var meter, such as var meter 36, would be required if var meter 36 were arranged with separate output signals responsive to the reactive power of its associated generator.

In the event the alternating current generator 10 is not connected to bus 14, the error detector 76 is short circuited by contacts 86 which are responsive to the condition of breaker 20 through linkage 88. When circuit breaker 20 is closed, contacts 86 are opened, activating error detector 76. When circuit breaker 20 is open, contacts 86 are closed, thus by-passing error detector 76.

In order to complete the current circuit which includes joint var controller 60, conductors 70 and 72 are connected together beyond the last alternating current generator on var control, as shown at 90.

If an error signal is produced by error detector 76, indicating that the alternating current generator 10 is not operating at the desired reactive power as determined by the generating system requirements, the error signal is applied to motor 32 through switch 92. Motor 32 will rotate in the direction determined by the polarity of the differential signal from error detector 76, changing the voltage level to be regulated by regulator 26 by adjusting voltage adjuster 28. Motor 32 may be either analog, or digital controlled. The regulated voltage level will be changed until the signals from var meter 74 and from joint var controller 60 are equal, at which time the error signal from error detector 76 will drop to zero, and motor 32 will stop rotating. Switch 92 allows the var control to be deactivated in the event that it is desired to operate alternating current generator 10 on voltage control alone.

In summary, the vars or reactive power of alternating current generator 10, and all other alternating current generators on joint var control, are controlled from a single reference or control point, the var control adjuster 52. Each alternating current generator, such as alternating current generator 10, has a var meter 36 which produces a signal responsive to the reactive power of its associated generator. These signals are collected or totalized to produce a signal responsive to the total reactive power of the system, such as in a totalizing var meter 48. A master var controller 50 compares the signal responsive to total system reactive power with a signal responsive to the desired system reactive power, produced by var control adjuster 52. The signal responsive to the desired system reactive power is predetermined by manually preselecting the desired system reactive power by adjustment of var control adjuster 52. Any difference between the signals responsive to actual and desired system reactive power results in a polarized signal which changes the magnitude of the master reference signal produced by joint var controller 60. The master reference signal is a substantially constant direct current signal for each setting of its motor operated rheostat 66, and is applied to an impedance located in error detector 76 at each generating station to produce substantially the same reference signal at each alternating current generator on var control. The signal developed at each generating station from joint var controller 60 is compared with a signal produced at each alternating current generator station responsive to the reactive power of the generator, such as a signal from var meter 74. Any difference between the signals from joint var controller 60 and var meter 74 results in a polarized error signal for that particular alternating current generator, which changes the magnitude of the voltage to be regulated by voltage regulator 26, by changing the position of voltage adjuster 28. The regulated voltage level changes until the signals from var meter 74 and from joint var controller 60 are equal.

Although the reactive power control system has been described with the vars of all machines under joint var control being totalized, it will be understood that the totalizing var meter 48 may totalize the vars of all or selected plant machines, and not just those under joint var control.

Since numerous changes may be made in the above described apparatus and different embodiments of the invention may be made without departing from the spirit thereof, it is intended that all matter contained in the foregoing description or shown in the accompanying drawing shall be interpreted as illustrative and not in a limiting sense.

I claim as my invention:

1. A control system for controlling the reactive power of an alternating current system comprising, a plurality of alternating current generators, first means producing a first signal responsive to the total reactive power of the alternating current system, second means producing a second signal responsive to the desired reactive power of the alternating current system, third means comparing said first and second signals and producing a third signal when said first and second signals are unequal, said third signal having a polarity and magnitude responsive to which of said first and second signals is larger and to the magnitude of the difference, fourth means producing a fourth signal whose magnitude is responsive to said third signal, fifth means producing a fifth signal at each of said alternating current generators responsive to the reactive power of each alternating current generator, sixth means comparing said fourth and fifth signals at each of said alternating current generators, said sixth means producing a sixth signal when said fourth and fifth signals are unequal, said sixth signal having a polarity and magnitude responsive to which of said fourth and fifth signals is larger and to the magnitude of the difference, seventh means independently controlling the output voltage level of each of said alternating current generators, said sixth signal connected in circuit relation with said seventh means and controlling the output voltage level of each of said alternating current generators independently, to provide the desired reactive power for the alternating current system.

2. A control system for controlling the reactive power of an alternating current system comprising, a plurality of alternating current generators, first means producing a first signal at each of said alternating current generators responsive to the reactive power of its associated alternating current generator, second means totalizing said first signal and producing a second signal responsive to the total reactive power of the alternating current system, third means producing a third signal responsive to the desired reactive power of the alternating current system, fourth means comparing said second and third signals and producing a fourth signal when said second and third signals are unequal, said fourth signal having a polarity and magnitude responsive to which of said second and third signals is larger and to the magnitude of the difference, fifth means producing a fifth signal whose magnitude is responsive to said fourth signal, sixth means producing a sixth signal at each of said alternating current generators responsive to the reactive power of its associated alternating current generator, seventh means comparing said fifth and sixth signals at each of said alternating current generators, said seventh means producing a seventh signal when said fifth and sixth signals are unequal, said seventh signal having a polarity and magnitude responsive to which of said fifth and sixth signals is larger and to the magnitude of the difference, and eighth means independently controlling the output voltage of each of said alternating current generators, said seventh signal being connected in circuit relation with said eighth means and controlling the output voltage level of each of said alternating current generators independently to provide the desired system reactive power.

3. A control system for controlling the reactive power of an alternating current generator system comprising, a plurality of alternating current generators, first means producing first and second signals at each of said alternating current generators each responsive to the reactive power of its associated alternating current generator, second means totalizing said first signals and producing a third signal responsive to the total reactive power of the alternating current system, third means producing a fourth signal responsive to the desired reactive power of the alternating current system, fourth means comparing said third and fourth signals and producing a fifth signal when said third and fourth signals are unequal, said fifth signal having a polarity and magnitude responsive of which of said third and fourth signals is larger and to the magnitude of the difference, fifth means producing a sixth signal whose magnitude is responsive to said fifth signal, sixth means comparing said fifth and second signals at each of said alternating current generators, said sixth means producing a sixth signal when said fifth and second signals are unequal, said sixth signal having a polarity and magnitude responsive to which of said fifth and second signals is larger and to the magnitude of the difference, and seventh means independently controlling the output voltage of each of said alternating current generators, said sixth signal being connected in circuit relation with said seventh means and controlling the output voltage level of each of said alternating current generators independently to provide the desired system reactive power.

4. A control system for controlling the reactive power of an alternating current system comprising, a plurality of alternating current generators, var meter means associated with each of said plurality of alternating current generators, said var meter means each producing first and second signals each responsive to the reactive power of its associated alternating current generator, totalizing means connected in circuit relation with said var meter means and producing a third signal responsive to the sum of said first signals, var control adjuster means for selecting the reactive power level of said alternating current system, said var control adjuster means producing a fourth signal responsive to the selected reactive power level, first comparison means comparing said third and fourth signals and producing a fifth signal when said third and fourth signals are unequal, said fifth signal having a polarity and magnitude responsive to which of said third and fourth signals is larger and to the magnitude of the difference, means producing a sixth signal, the magnitude of said sixth signal being responsive to said fifth signal, second comparison means comparing said sixth and second signals at each alternating current generator and producing a seventh signal when said sixth and second signals are unequal, said seventh signal having a polarity and magnitude responsive to which of said sixth and second signals is larger and to the magnitude of the difference, and voltage adjusting means for independently adjusting the output voltage level of each alternating current generator, said voltage adjusting means being responsive to said seventh signal to adjust the output voltage level of each alternating current generator to provide the desired system reactive power.

References Cited

UNITED STATES PATENTS

| | | | |
|---|---|---|---|
| 2,972,058 | 2/1961 | Kahle | 307—57 |
| 3,185,857 | 5/1965 | Johnson | 307—57 |
| 3,217,171 | 11/1965 | Corey | 307—57 |

ORIS L. RADER, *Primary Examiner.*

T. J. MADDEN, *Assistant Examiner.*